(12) United States Patent
Magara (10) Patent No.: US 11,899,439 B2
(45) Date of Patent: Feb. 13, 2024

(54) METHOD AND DEVICE FOR CALCULATING DEGREE OF ABNORMALITY

(71) Applicant: SEIKO EPSON CORPORATION, Tokyo (JP)

(72) Inventor: Shinji Magara, Matsumoto (JP)

(73) Assignee: SEIKO EPSON CORPORATION, Tokyo (JP)

( * ) Notice: Subject to any disclaimer, the term of this patent is extended or adjusted under 35 U.S.C. 154(b) by 12 days.

(21) Appl. No.: 17/658,698

(22) Filed: Apr. 11, 2022

(65) Prior Publication Data

US 2022/0326702 A1 Oct. 13, 2022

(30) Foreign Application Priority Data

Apr. 12, 2021 (JP) .................. 2021-067032

(51) Int. Cl.
*G06F 11/30* (2006.01)
*G05B 23/02* (2006.01)
*G01M 99/00* (2011.01)

(52) U.S. Cl.
CPC ....... *G05B 23/0275* (2013.01); *G01M 99/005* (2013.01)

(58) Field of Classification Search
CPC .................................. G01M 99/005
See application file for complete search history.

(56) References Cited

U.S. PATENT DOCUMENTS

2012/0257833 A1* 10/2012 Guo .................. G06V 10/25
382/199

OTHER PUBLICATIONS

Introduction to Anomaly Detection using Machine Learning, 2005 (Year: 2005).*
Introduction to Anomaly Detection using Machine Learning, 2005. Introduction to Anomaly Detection using Machine Learning(Issuance information), 2005.

* cited by examiner

*Primary Examiner* — Phuong Huynh
(74) *Attorney, Agent, or Firm* — CHIP LAW GROUP (57) ABSTRACT

A method includes acquiring data indicating a plurality of sensor detection values arranged in order along a specific variable axis, detecting, in the data, a plurality of change points that are data points at which the sensor detection value on the specific variable axis changes by a predetermined value or more, and calculating, for a target change point that is one change point among the plurality of change points, an index value representing a degree of abnormality using the target change point and a reference change point that is another change point.

8 Claims, 11 Drawing Sheets

FIRST : (−1, 0, 1) × (10, 9, 22) = 12

SECOND : (−1, 0, 1) × (11, 12, 18) = 6

METHOD AND DEVICE FOR CALCULATING DEGREE OF ABNORMALITY

The present application is based on, and claims priority from JP Application Serial Number 2021-067032, filed Apr. 12, 2021, the disclosure of which is hereby incorporated by reference herein in its entirety.

BACKGROUND

1. Technical Field

The present disclosure relates to a technique for calculating a degree of abnormality of a change point from data.

2. Related Art

In the manufacturing site, a processing state and product characteristics are acquired and managed as time series data using a sensor. Here, as an analysis method of the acquired time series data, it is conceivable to analyze a degree of abnormality in a case where there is abnormality in the change point on the data, and perform a root cause analysis of abnormal occurrence. Recently, a self-regression model, neighbor method, specific spectral conversion method are known as a technique for detecting abnormality of time-series data (Takeshi Ide, Introductory Anomaly Detection by Machine Learning-Practical Guide by R-, Corona Publishing Co., Ltd., 2015).

In the related art, a unique evaluation index is calculated for each of the methods, and abnormality is detected, but the degree of abnormality is difficult to be calculated quantitatively.

SUMMARY (1) According to a first aspect of the present disclosure, a method is provided. This method includes acquiring data indicating a plurality of sensor detection values arranged in order along a specific variable axis, detecting, in the data, a plurality of change points that are data points at which the sensor detection value on the specific variable axis changes by a predetermined value or more, and calculating, for a target change point that is one change point among the plurality of change points, an index value representing a degree of abnormality using the target change point and a reference change point that is another change point.

(2) According to a second aspect of the present disclosure, a device is provided. This device includes an acquisition unit configured to acquire data indicating a plurality of sensor detection values arranged in order along a specific variable axis, a detection unit configured to detect a plurality of change points that are data points at which the sensor detection value on the specific variable axis changes by a predetermined value or more in the data, and a calculation unit configured to calculate, for a target change point that is one change point among the plurality of change points, an index value representing a degree of abnormality of the target change point using the target change point and a reference change point that is another change point.

(3) According to a third aspect of the present disclosure, a computer program is provided. This computer program causes a computer to perform an acquisition function configured to acquire data indicating a plurality of sensor detection values arranged in order along a specific variable axis, a detection function configured to detect a plurality of change points that are data points at which the sensor detection value on the specific variable axis changes by a predetermined value or more in the data, and a calculation function configured to calculate, for a target change point that is one change point among the plurality of change points, an index value representing a degree of abnormality of the target change point using the target change point and a reference change point that is another change point.

DESCRIPTION OF EXEMPLARY EMBODIMENTS

A. Exemplary Embodiment

Figure 1:
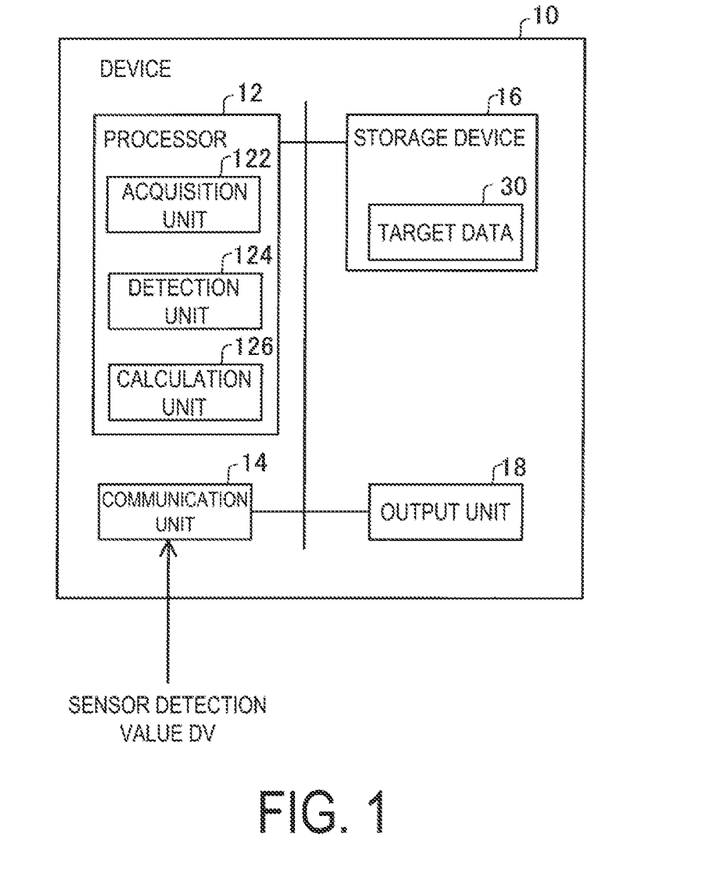
FIG. 1 is a diagram illustrating an device for detecting abnormality of an exemplary embodiment.

FIG. 1 is a diagram illustrating an device 10 for detecting abnormality of a change point in an exemplary embodiment. The device 10 is, for example, an electronic calculator such as a personal computer. The device 10 acquires data indicating a plurality of sensor detection values DV arranged in order along a specific variable axis from various sensors such as a current sensor or a temperature sensor, and calculates an index value VL representing a degree of abnormality from the acquired data. In other words, the device 10 detects the abnormality of the data quantitatively.

The device 10 includes a processor 12, a communication unit 14, a storage device 16, and an output unit 18. The processor 12 controls operation of the device 10 by executing various programs stored in the storage device 16. For example, the processor 12 functions as an acquisition unit 122, a detection unit 124, and a calculation unit 126. Note that in other exemplary embodiments, at least a part of various functions executed by the processor 12 may be implemented by a hardware circuit. Here, the "processor" is a term encompassing CPU, GPU, and hardware circuitry.

The communication unit 14 is an interface that exchanges data with a wired or wireless device. The acquisition unit 122 of the processor 12 acquires, via the communication unit 14, data indicating a plurality of sensor detection values arranged in order from the sensor, for example, along a time axis as a specific variable axis. In other words, the acquisition unit 122 acquires data indicating the plurality of sensor detection values DV by receiving the plurality of sensor detection values DV arranged in order along the time axis and storing them in the storage device 16. The acquired data is stored in the storage device 16 as target data 30.

The storage device 16 includes a non-transitory storage medium such as flash memory or EEPROM, and DRAM as a main memory. The storage device 16 stores the target data 30 and various programs for performing operation of the device 10.

The output unit 18 is used to output various types of information. The output unit 18 is, for example, a liquid crystal monitor. As various types of information, for example, an analysis result of the target data 30 analyzed by the processor 12 is displayed. The output unit 18 may be a sound output device that outputs a sound instead of a display device such as a liquid crystal monitor.

Figure 2:
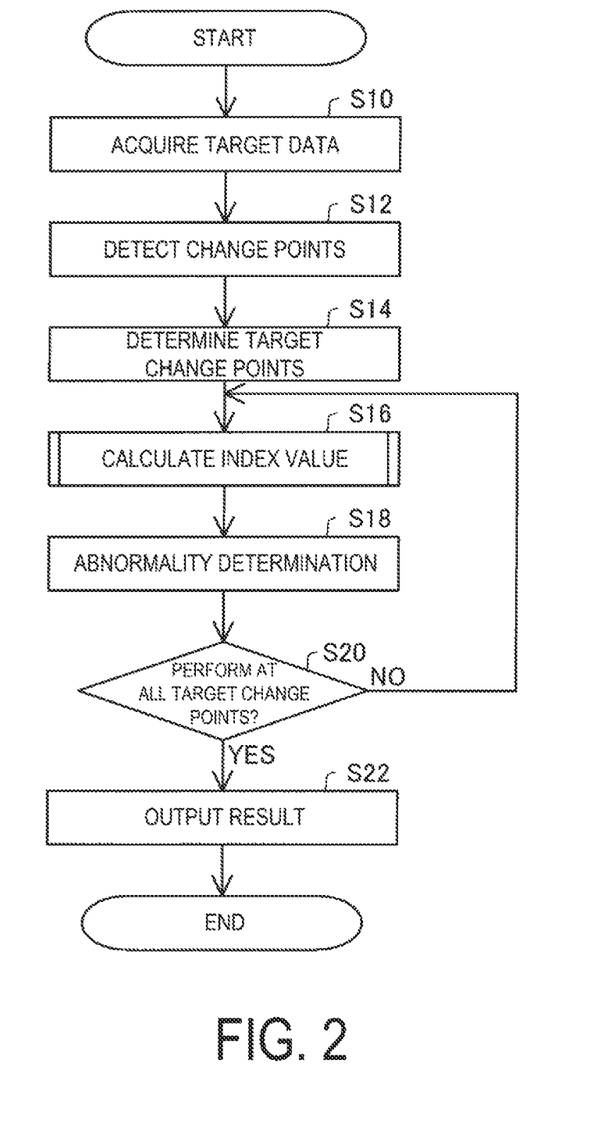
FIG. 2 is a flowchart of an abnormality detection process performed by the device.
Figure 3:
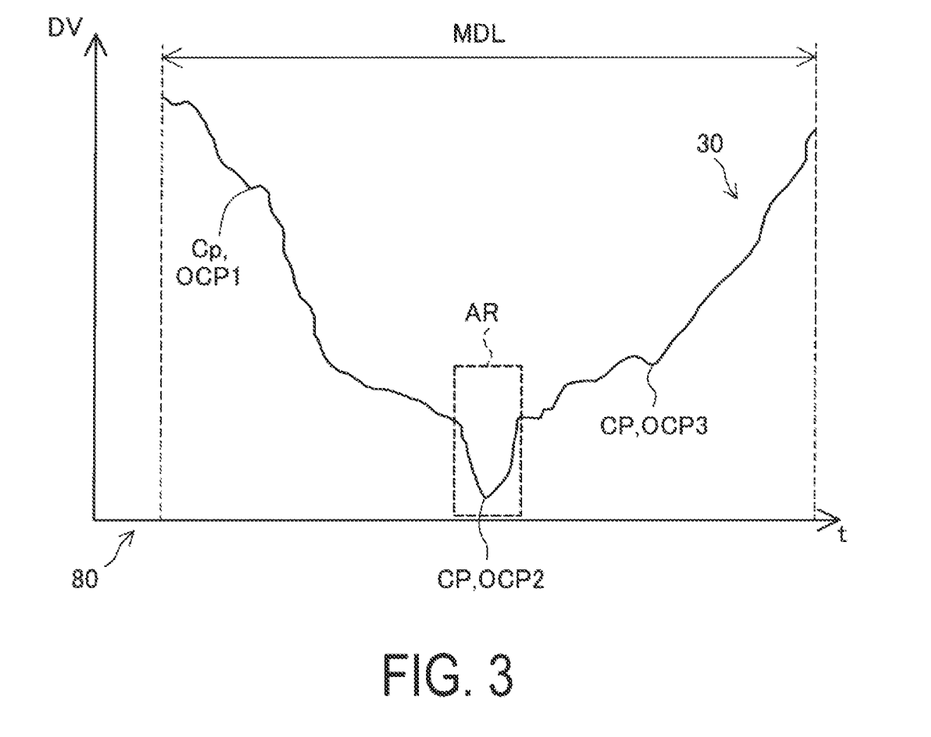
FIG. 3 is a diagram illustrating an example of target data.
Figure 4:
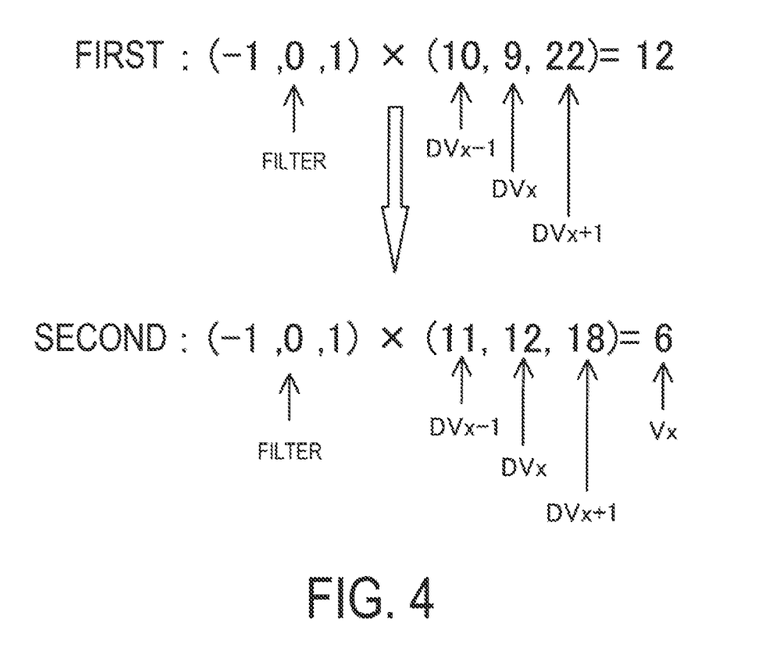
FIG. 4 is a diagram for illustrating step S12.
Figure 5:
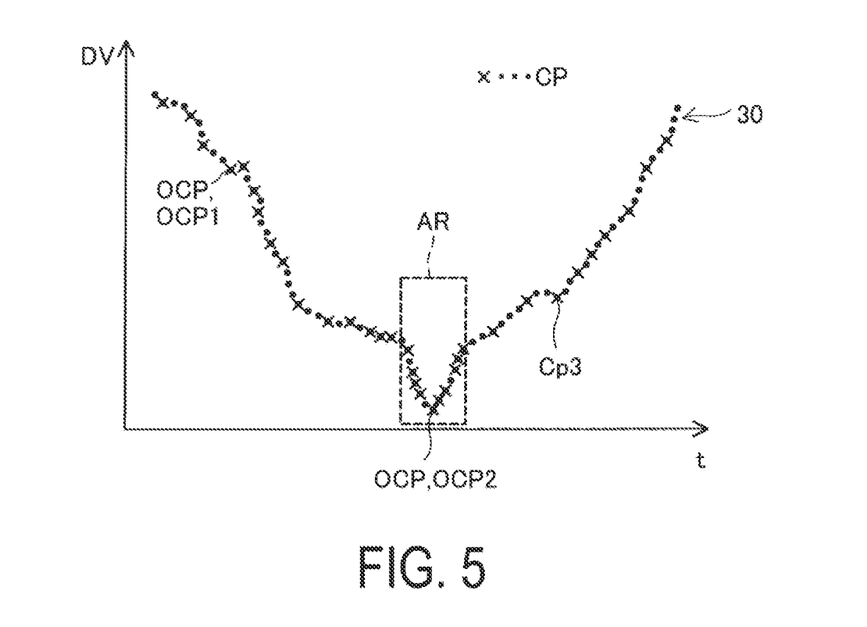
FIG. 5 is a diagram illustrating the abnormality detection process.

FIG. 2 is a flowchart of an abnormality detection process performed by the device 10. FIG. 3 is a diagram illustrating an example of the target data 30. FIG. 4 is a diagram for illustrating step S12. FIG. 5 is a diagram illustrating the abnormality detection process.

As illustrated in FIG. 2, in step S10, the acquisition unit 122 of the device 10 acquires the target data 30 by receiving the sensor detection value DV sequentially from the external sensor, and storing it in the storage device 16. In the present exemplary embodiment, as illustrated in FIG. 3, the target data 30 is, for example, data acquired from a temperature sensor, and the horizontal axis is a time as the specific variable axis, and the vertical axis is a temperature that is the sensor detection value.

As illustrated in FIG. 2, in step S20 after step 10, the detection unit 124 of the processor 12 detects a plurality of change points CP that are data points at which the sensor detection value DV on the specific variable axis changes by a predetermined value or more in the target data 30. For example, the detection unit 124 of the processor 12 calculates a change index value Vx of a target sensor detection value DVx using the target sensor detection value DVx that is one target sensor detection value DV and two sensor detection values DVx−1 and DVx+1 located on both sides of the target sensor detection value DVx on the time axis. Then, when the calculated change index value Vx satisfies a predetermined criterion, the detection unit 124 of the processor 12 detects that the data point indicating the target sensor detection value DVx is a change point CP at which the sensor detection value DV changes by a predetermined value or more. As a result, the change point CP can be easily detected using the target sensor detection value DVx and the two sensor detection values DVx−1 and DVx+1 located on both sides thereof. In the present exemplary embodiment, the detection unit 124 of the processor 12 applies the Canny method used for edge detection of a two-dimensional image to the target data 30, which is one-dimensional data, to detect the plurality of change points CP. Specifically, a Sobel filter modified for application in one dimension in the time axis direction, which is the specific variable axis, is applied to the target data 30 to detect the plurality of change points CP. Specifically, as illustrated in FIG. 4, the change index value Vx of one sensor detection value DVx is calculated by multiplying the filter (−1, 0, 1) as a Sobel filter twice to the target data 30.

As illustrated in FIG. 4, the change index value Vx of one sensor detection value DVx is calculated by multiplying the filter (−1, 0, 1) twice as a Sobel filter to the three sensor detection values DVx−1, DVx, DVx+1 arranged in order on the time axis. Note that the calculation method of the change index value Vx of the one sensor detection value DVx is not limited thereto. For example, the change index value Vx may be calculated by multiplying only one filter (−1, 0, 1) as a Sobel filter. In addition, for example, the change index value Vx may be calculated by multiplying the other filters, the Laplacian filter (1, −2, 1), to the three sensor detection values DVx−1, DVx, DVx+1 arranged in order on the time axis.

In the above-described exemplary embodiment, in step S12, the processor 12 calculates the change index value Vx at each data point of the target data 30, and detects the top 100 data points having large values from a plurality of the change index values Vx are change points CP as data points at which the sensor detection value DV changes by a predetermined value or more. Note that in other exemplary embodiments, the processor 12 may detect the change index value Vx that is equal to or greater than a predetermined threshold value as the change point CP as data at which the sensor detection value DV changes by a predetermined value or more.

As illustrated in FIG. 2, in step S14, the processor 12 determines the target change point OCP, which is one change point CP that is a target for calculating the index value VL representing the degree of abnormality from among the plurality of change points CP. The processor 12 determines the peak data points and the valley data points in the target data 30 as the target change point OCP. More specifically, the processor 12 determines, the specific change point CP as the target change point OCP in at least one of a first case or a second case. In the first case, among the plurality of change points CP constituting the target data 30, for the specific change point CP, two of the sensor detection values DV indicated by two of the change points CP located before and after the specific variable axis are greater than the sensor detection value DV of the specific change point CP. In the second case, it is smaller than the sensor detection value DV of the specific change point CP. In order to determine the target change point OCP, whether to use either the first case and the second case, or both the first case and the second case as the determination conditions may be predetermined or may be set by a user. In the present exemplary embodiment, a determination condition is set in advance to the device 10 so that the specific change point CP is determined as the target change point OCP when the above-described first case is satisfied. In the example illustrated in FIG. 5, among the plurality of change points CP, the three change points CP forming the valley of the data are determined as the target change points OCP1, OCP2, and OCP3. When it is used without distinguishing between the target change points OCP1, OCP2, and OCP3, it is referred to as the target change point OCP. As described above, the processor 12 can easily determine the target change point OCP, depending on whether or not the first case or the second case is satisfied using the three sensor detection values DV.

As illustrated in FIG. 2, in step S16, the calculation unit 126 of the processor 12 calculates, at each of the determined target change points OCP1, OCP2, and OCP3, the index value VL representing the degree of abnormality of the target change point OCP using the target change point OCP and the reference change point SCP that is the other change point CP. The reference change point SCP is determined by the method described below from among extraction reference points ESP1 to ESP10, which are the change points CP different from the target change point OCP. Hereinafter, a step of calculating the index value VL is described using an example of the index value VL of the target change point OCP2 illustrated in FIG. 5.

Figure 6:
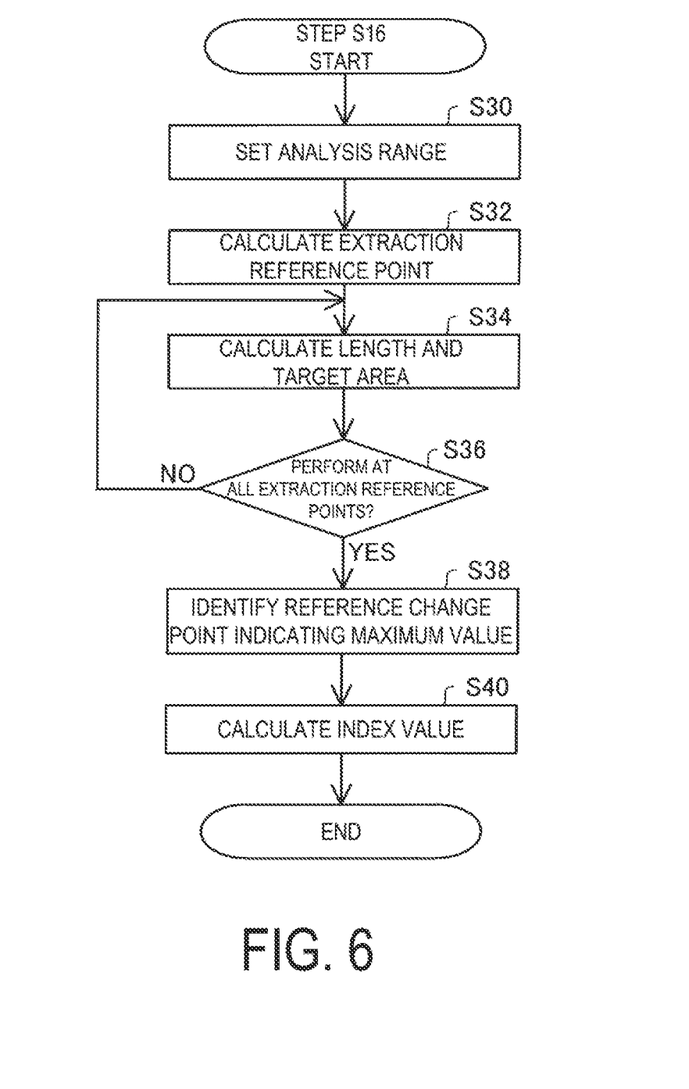
FIG. 6 is a flowchart of step S16.
Figure 7:
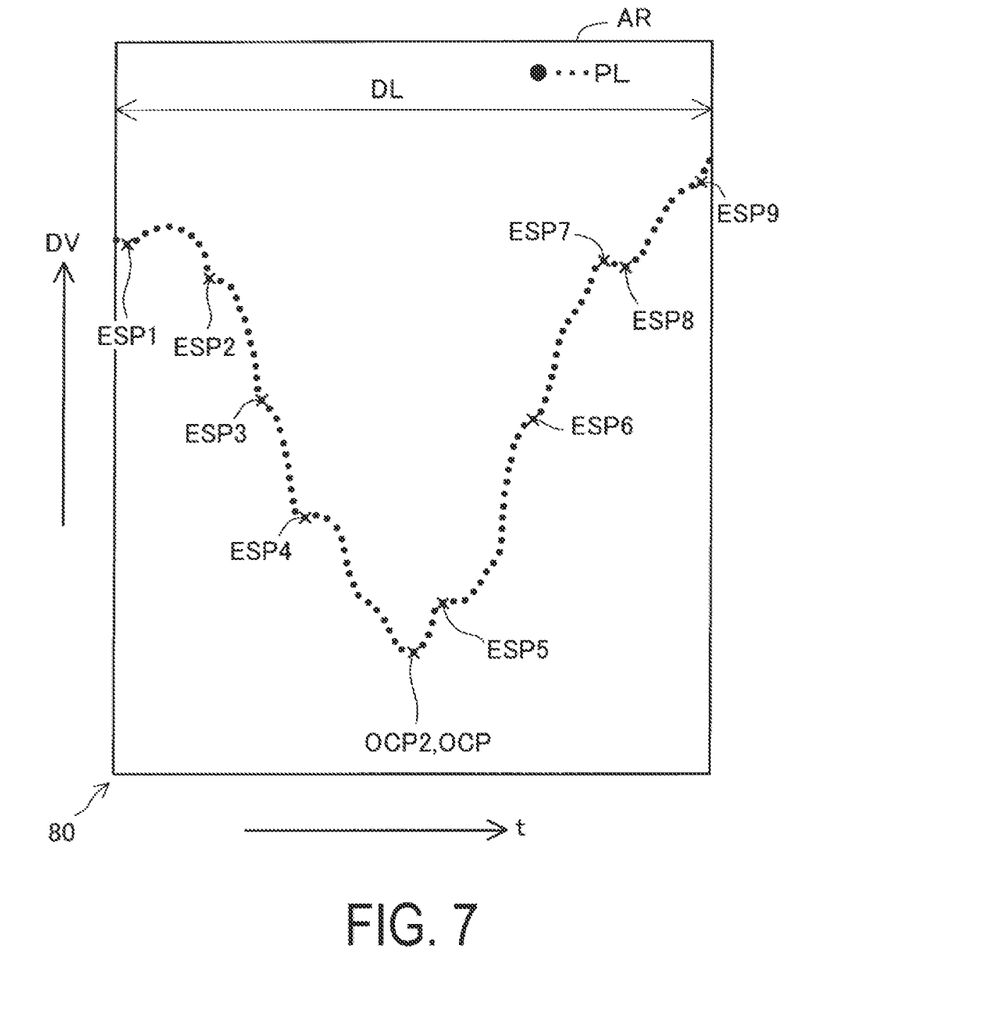
FIG. 7 is a diagram for illustrating step S16.

FIG. 6 is a flowchart of step S16. FIG. 7 to FIG. 11 are diagrams for illustrating step S16. As illustrated in FIG. 6, first, in step S30, the processor 12 sets an analysis range AR about the target change point OCP for a time axis that is the specific variable axis. The analysis range AR is configured such that a data length DL along the specific variable axis centered on the target change point OCP illustrated in FIG. 7 is 1/10 of a total data length MDL of the target data 30 illustrated in FIG. 3. Note that the analysis range AR is not limited to the above, and in order to reduce the amount of data to be analyzed, the data length DL may be smaller than the total data length DL.

As illustrated in FIG. 6, in step S32, the processor 12 extracts the extraction reference point ESP that is another change point CP that is different from the target change point OCP among the analysis range AR. In the present exemplary embodiment, as illustrated in FIG. 7, there are nine extraction reference points ESP1 to ESP9 in the analysis range AR. As illustrated in FIG. 7, the processor 12 sequentially selects the extraction reference points from the extraction reference point ESP1 located at the earliest time along the time axis which is the specific variable axis, and executes the process after step S34 for all the extraction reference points ESP1 to ESP9. Note that when the extraction reference points ESP1 to ESP9 are used without distinction, they are referred to as the extraction reference point ESP.

Next, as illustrated in FIG. 6, in step S34, the processor 12 calculates a length LL of an auxiliary line L as a line segment described below, and a target area S using the extraction reference ESP and the target change point OCP2. A calculation method of the length LL of the auxiliary line L as a line segment and the target area S of the target region R when the extraction reference point ESP is the first extraction reference point ESP1 will be described with reference to FIG. 8. Note that, for ease of understanding, the target region R and the target area S of the first extraction reference point ESP1 to the ninth extraction reference point ESP9 may be distinguished from the target regions R1 to R9 and the target areas S1 to S9. Additionally, the auxiliary line L as a line segment corresponding to the first extraction reference point ESP1 to the ninth extraction reference point ESP9 may be distinguished from the auxiliary lines L1 to L9.

Figure 8:
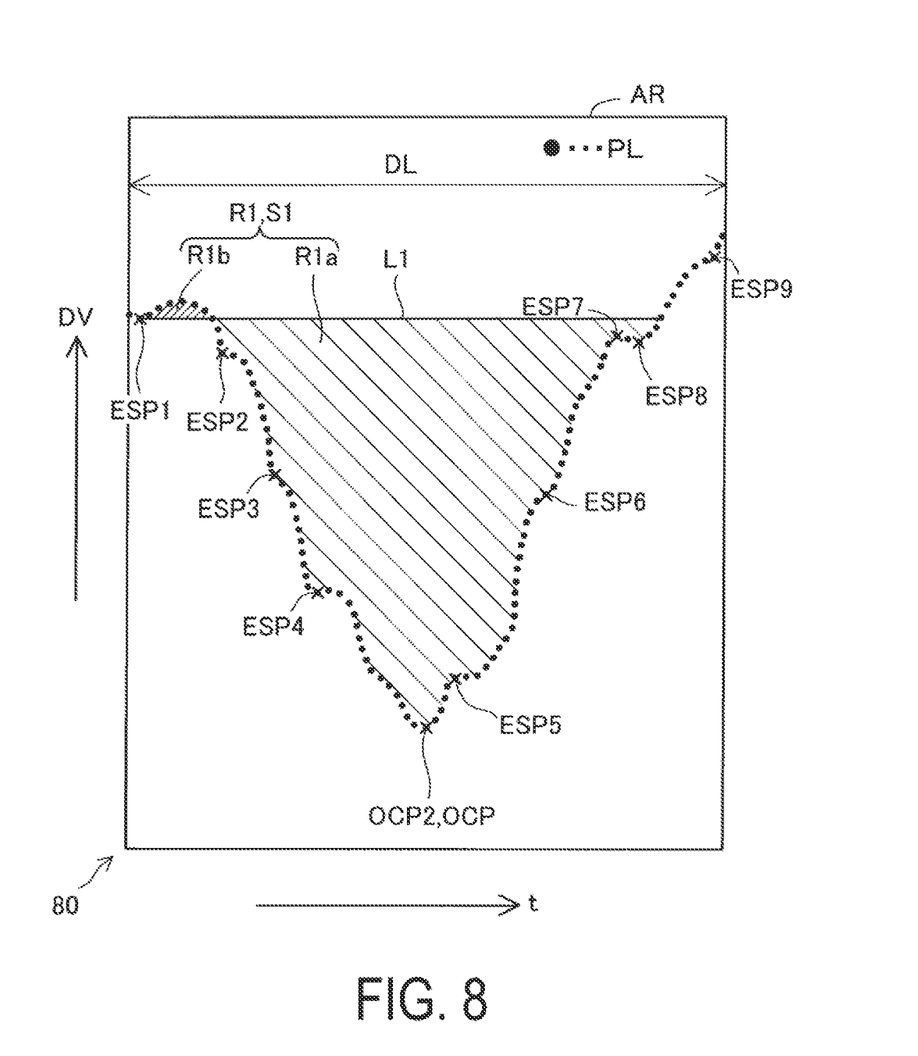
FIG. 8 is a diagram for illustrating step S16.

In a two-axis graph 80 in which the target data 30 is represented by a time axis that is the specific variable axis and a detection axis that is orthogonal to or different from the specific variable axis and represents the sensor detection value DV, the processor 12 generates an auxiliary line L1 that is a line segment extending from the extraction reference point ESP1 along the time axis that is the specific variable axis. The auxiliary line L1 extends toward the opposite side from the extraction reference point ESP1 with respect to the time axis, which is the specific variable axis, across the target change point OCP2. In a case where one of the plurality of plot PL intersects with the auxiliary line L1, the value in the specific variable axis at an end portion on the opposite side to the auxiliary line L1 is the value of the intersecting plot PL. In a case where one of the plurality of plot PL does not intersect with the auxiliary line L1, the value is the intermediate value of two plots PL sandwiching this end portion with respect to the specific variable axis. The length LL1 of the auxiliary line L1 that is a line segment is the length of the line segment of the auxiliary line L1 forming the target region R1. In other words, the processor 12 calculates the length LL1 of the auxiliary line L1, which is the interval between the base end portion and the tip portion of the auxiliary line L1, and stores it in the storage device 16. Next, the processor 12 calculates the target area S1, which is an area of the target region R1 surrounded by the auxiliary line L1 and the plurality of plots PL on the graph 80 corresponding to the plurality of sensor detection values DV. The processor 12 calculates the area S1 of the target region R1 by setting an area of the first region R1a located on the same side as the target change point OCP2 with respect to the auxiliary line L1 as a positive value, and an area of the second region R1b located on the opposite side to the target change point OCP2 with respect to the auxiliary line L1 as a negative value. In this way, the processor 12 can easily calculate the target area S using the target region R and the auxiliary line L. In the present exemplary embodiment, for the first region R1a, the processor 12 calculates a first total value by summing the absolute values of the differences between the sensor detection value DV indicated by the auxiliary line L1 and the sensor detection value DV of each plot PL constituting the target region R1. In addition, for the second region R1b, the processor 12 calculates a second total value by summing the absolute values of the differences between the sensor detection value DV indicated by the auxiliary line L1 and the sensor detection value DV of each plot PL constituting the target region R1. The processor 12 handles the second total value as a negative value. In other words, the processor 12 calculates the target area S1 of the target region R1 by subtracting the second total value from the first total value. The processor 12 stores the calculated target area S1 in the storage device 16. Note that the calculation method of the target area S1 in the target region R1 is not limited to the above. For example, the processor 12 may represent the plurality of plots PL with an approximate curve using the least squares method, and calculate the area surrounded by the approximate curve and the auxiliary line L1 as the target area S1 of the target region R1. The approximate curve is represented by the n-th function, where n is an integer of, for example, 3 or more. In this case as well, the processor may calculate the total area as the target area S1 by setting the area of the first region R1a as a positive value and the area of the second region R1b as a negative value.

As illustrated in FIG. 6, in step S36, the processor 12 determines whether the length L and the target area S are calculated in all the extraction reference points ESP extracted in step S32. When the determination of "NO" is made in step S36, by performing step S34 again, the processor 12 calculates the length L2 and the target area S2 using the next extraction reference point ESP2 and the target change point OCP2. A calculation method of the length L and the target area S2 will be described using FIG. 9.

Figure 9:
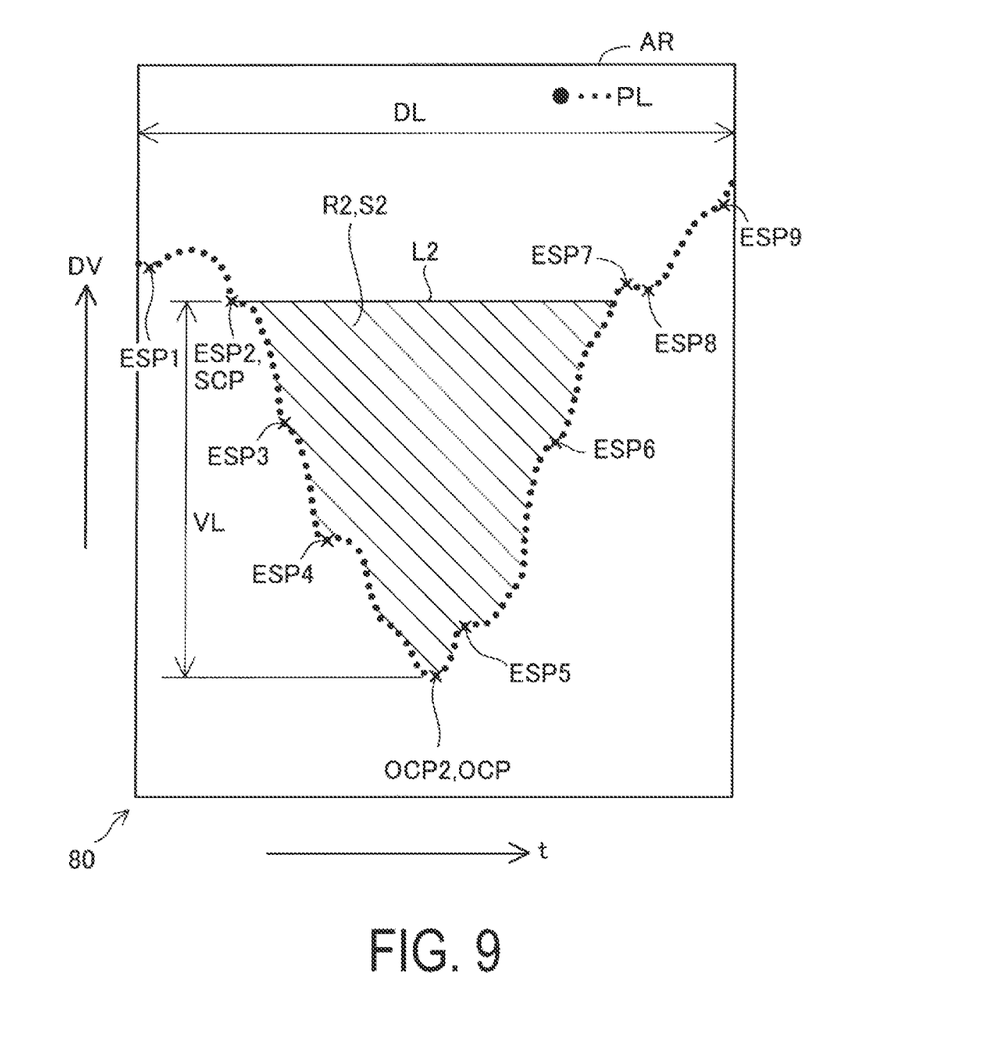
FIG. 9 is a diagram for illustrating step S16.
Figure 10:
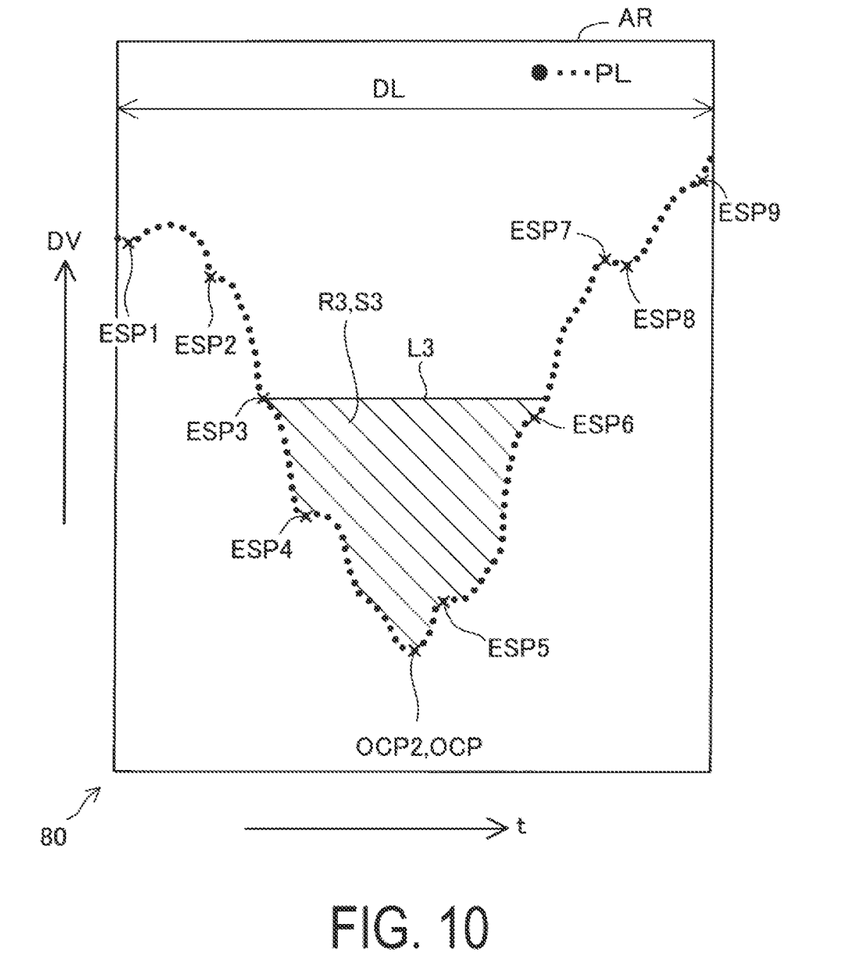
FIG. 10 is a diagram for illustrating step S16.

As illustrated in FIG. 9, in the graph 80, the processor 12 generates the auxiliary line L2 along a time axis that is the specific variable axis from the extraction reference point ESP2. This auxiliary line L2 extends from the extraction reference point ESP2 toward the other side of the target change point OCP2. Next, the processor 12 calculates the length LL2 of the auxiliary line L2 in the same manner as the auxiliary line L1 described above. Next, the processor 12 calculates the target area S2, which is an area of the target region R2 surrounded by the auxiliary line L2 and the plurality of plots PL on the graph 80 corresponding to the plurality of sensor detection values DV. The calculation method of the target area S2 is the same method as the calculation method of the target area S1 described above, and thus descriptions thereof will be omitted. Note that, as illustrated in FIG. 10, for the extraction reference point ESP3, similar to the extraction reference points ESP1, 2 described above, the target area S3, which is an area of the target region R3 surrounded by the length LL3 of the auxiliary line L3 and the plurality of plots PL on the graph 80 corresponding to the auxiliary line L3 and the plurality of sensor detection values, is calculated.

Figure 11:
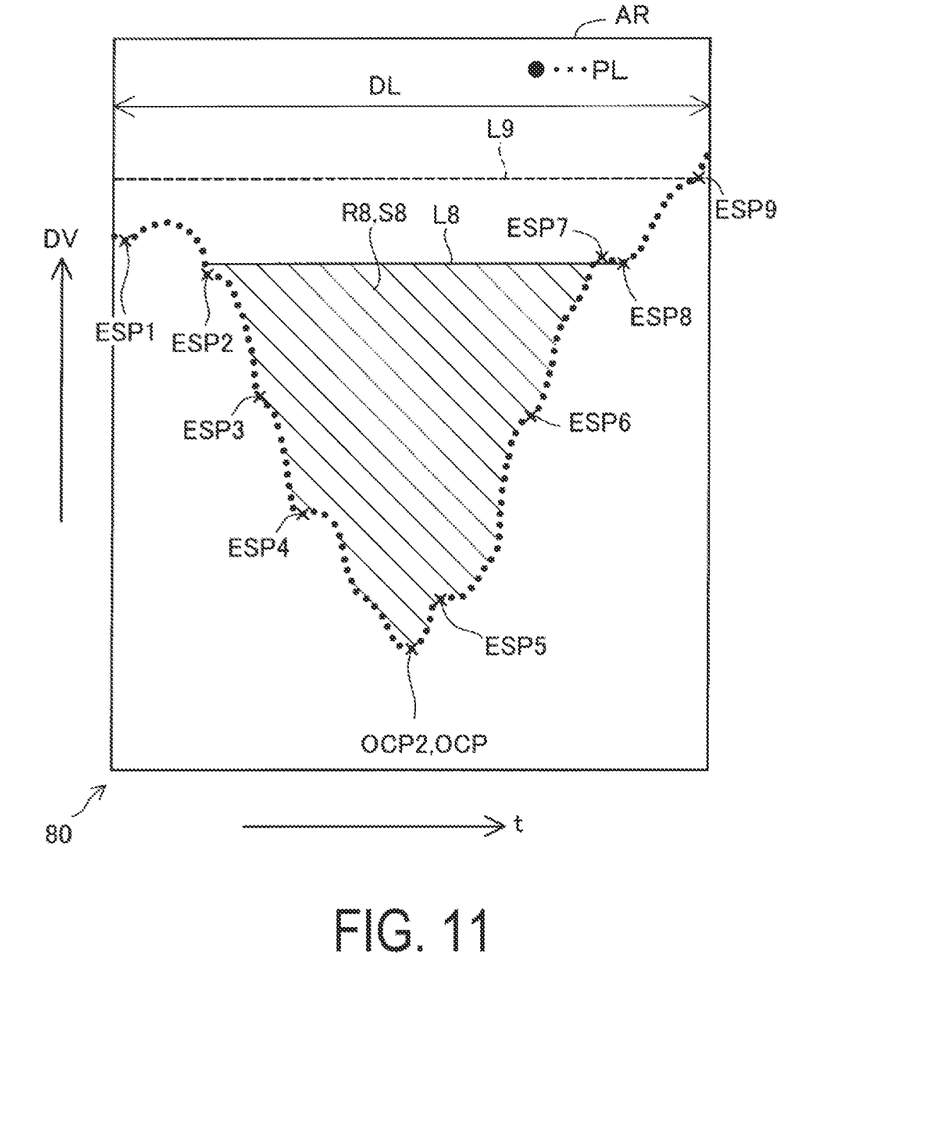
FIG. 11 is a diagram for illustrating step S16.

Further, as illustrated in FIG. 11, when the extraction reference point ESP8 is located on the right side with respect to the target change point OCP2 on the time axis, the auxiliary line L8 extends toward the left side, which is opposite to the extraction reference point ESP8, across the target change point OCP2 with regard to the time axis. Then, the processor 12 calculates the target area S8 of the target region R8. Note that in the case of the extraction reference point ESP9, the tip end side of the auxiliary line L9 having the extraction reference point ESP9 as the base point does not intersect the plurality of plots PL or the approximate curve of the plurality of plots PL on the graph 80. In this case, the processor 12 ends step S34 without calculating the target area S9 corresponding to the extraction reference point ESP9. As described above, step S34 for calculating the target area S, is performed with respect to the change points CP located in the analysis range AR about the target change point OCP2 with regard to the time axis that is the specific variable axis.

As illustrated in FIG. 6, in a case that the determination of "YES" is made in step S36, in step S38, the processor 12 calculates the ratio (=target area S/length L) of the target areas S1 to S8 based on the lengths LL1 to LL8 using the lengths LL1 to LL8 calculated at each of the extraction reference points ESP1 to ESP8 and the target areas S1 to S8, and determines the extraction reference point ESP having the largest ratio as the reference change point SCP. In the present exemplary embodiment, the processor 12 determines the extraction reference point ESP2 as the reference change point SCP because the target area S2/length LL2 illustrated in FIG. 9 is the maximum value. In this way, the processor 12 can determine the reference change point SCP using the target area S and the length LL of the line segment.

As illustrated in FIG. 6, in step S40, the processor 12 calculates the index value VL using the target change point OCP2 and the reference change point SCP determined in step S38. In the present exemplary embodiment, as illustrated in FIG. 9, the processor 12 calculates, as the index value VL, the absolute value of the difference between the target detection value that is the sensor detection value DV at the target change point OCP2, and the reference detection value that is the sensor detection value DV at the reference change point SCP. Accordingly, the index value VL can be easily calculated using the target detection value and the reference detection value.

As illustrated in FIG. 2, in step S18, the processor 12 executes abnormality determination of whether abnormality is occurring at the target change point OCP. Specifically, the processor 12 compares the index value VL calculated in step S18 with the predetermined reference threshold value SVL, and determines that the abnormality has occurred at the target change point OCP when the index value VL exceeds the reference threshold value SVL. In this way, the processor 12 can easily determine the presence or absence of the abnormality at the target change point OCP using the quantified index value VL. The reference threshold value SVL may be appropriately set in accordance with the sensor detection value DV of the abnormality determination target, and may be stored in the storage device 16 in advance or may be configured by a user.

In step S18, the processor 12 determines whether or not the abnormality determination is performed for all of the target change points OCP1 to OCP3 in step S20. When the determination of "NO" is made in step S20, step S16 and subsequent steps are performed again for the target change point OCP for which the abnormality determination has not been executed. On the other hand, when the determination of "YES" is made in step S20, the processor 12 outputs the abnormality determination result to the output unit 18 as a result screen IM0 in step S22. In the above-described exemplary embodiment, the abnormality determination in step S18 may be performed when the determination of "YES" is made in step S20. In other words, the abnormality determination may be performed for each of the index values VL after the index value VL for all of the target change points OCP1 to OCP3 is calculated.

Figure 12:
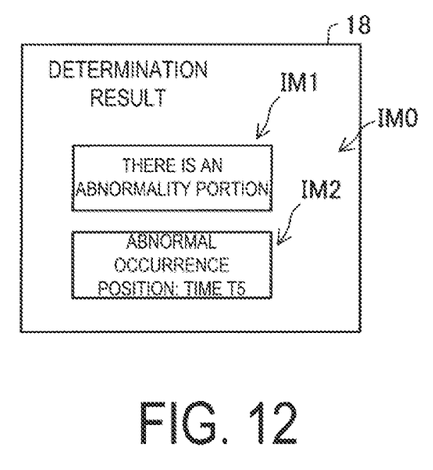
FIG. 12 is a diagram illustrating a result screen output to an output unit.

FIG. 12 is a diagram for describing the result screen IM0 output to the output unit 18. The result screen IM0 includes an abnormality presence screen IM1 indicating whether there is abnormality, and a detail screen IM2 indicating details of the abnormal portion in a case that there is abnormality. When it is determined that the abnormality has occurred in the abnormality determination of step S18 in FIG. 2, the abnormal presence screen IM1 displays "there is an abnormality portion" indicating that the abnormality has occurred. On the other hand, when it is determined that the abnormality has not occurred in the abnormality determination of step S18 of FIG. 2, the abnormal presence screen IM1 displays "there is no abnormality portion" indicating that the abnormality has not occurred. When "there is an abnormality portion" is displayed in the abnormal presence screen IM1, the detail screen IM2 displays the details of the occurrence point of the abnormality. In the present exemplary embodiment, the detail screen IM2 displays the abnormal occurrence time point that is the specific variable axis on which the abnormality has occurred, for example, "time t5". Note that the detail screen IM2 may include the index value VL in addition to the abnormal occurrence time point.

According to the above exemplary embodiment, as illustrated in FIGS. 6 and 8 to 11, the index value VL representing the degree of abnormality can be calculated using the target change point OCP and the reference change point SCP that is the other change point CP for the target change point OCP, and thus the degree of abnormality can be calculated quantitatively. According to the above-described exemplary embodiment, as illustrated in FIG. 8, in the target region R1, the area S1 of the first region R1a located on the same side as the target change point OCP2 with respect to the auxiliary line L1 is referred to as a positive value, and the area S1 of the second region R1b located on the opposite side to the target change point OCP with respect to the auxiliary line L1 as a negative value, so that the target region R corresponding to the extraction reference point ESP away from the target change point OCP can be suppressed from being the largest area uniformly.

Furthermore, in the above-described exemplary embodiment, the degree of abnormality can be quantified as the index value VL, and the product can be sorted according to the index value VL, so that a product having a high degree of abnormality can be extracted and the possibility of a product having a high degree of abnormal abnormality can be used again by extracting the manufacturing process.

B. Other Exemplary Embodiments

B-1. Other Exemplary Embodiment 1

In the exemplary embodiment described above, the specific variable axis is the time axis, but is not limited thereto. For example, the specific variable axis may be an axis representing changes such as temperature and pressure. Note that, when the data for the specific variable axis does not have equal intervals, the processor 12 may interpolate the data and calculate the target area S.

B-2. Other Exemplary Embodiment 2

In the exemplary embodiment described above, as illustrated in FIG. 9, the index value VL is the absolute value of the difference between the target detection value that is the sensor detection value DV at the target change point OCP2, and the reference detection value that is the sensor detection value DV at the reference change point SCP, but is not limited thereto. For example, the index value VL may employ various index values, and may be, for example, the target area S or the maximum slope of the tangent line of the approximate curve of each plot forming the target area S.

B-3. Other Exemplary Embodiment 3

The technique of the above exemplary embodiment can also be applied to a technique related to so-called blow-up in a social networking service (SNS). For example, by setting the sensor detection value DV as the number of hits of the keyword on the predetermined SNS, and by setting the time when the number of hits becomes extremely high as the target change point, the degree of blow-up, which corresponds to the degree of abnormality at this point, can be calculated. Further, the technique of the above exemplary embodiment may be used to generate supervised data by associating the presence or absence of abnormality with the target change point OCP as a label. This supervised data is used for learning the machine learning model. In this way, the presence or absence of the abnormality of the target change point OCP is output by inputting data indicating the plurality of sensor detection values arranged in order along the specific variable axis with respect to the learned machine learning model.

C. Other Aspects

The present disclosure is not limited to the exemplary embodiments described above, and may be implemented in various aspects without departing from the spirits of the disclosure. For example, the present disclosure may be achieved through the following aspects. Appropriate replacements or combinations may be made to the technical features in the above-described exemplary embodiments which correspond to the technical features in the aspects described below to solve some or all of the problems of the disclosure or to achieve some or all of the advantageous effects of the disclosure. Additionally, when the technical features are not described herein as essential technical features, such technical features may be deleted appropriately.

(1) According to a first aspect of the present disclosure, a method is provided. This method includes acquiring data indicating a plurality of sensor detection values arranged in order along a specific variable axis, detecting, in the data, a plurality of change points that are data points at which the sensor detection value on the specific variable axis changes by a predetermined value or more, and calculating, for a target change point that is one change point among the plurality of change points, an index value representing a degree of abnormality using the target change point and a reference change point that is another change point. According to this aspect, the index value representing the degree of abnormality can be calculated using the target change point and the reference change point that is the other change point for the target change point, and thus the degree of abnormality can be calculated quantitatively.

(2) In the above aspect, the calculation of the index value may include the calculation of the index value may include calculating, as the index value, an absolute value of a difference between a target detection value that is the sensor detection value at the target change point and a reference detection value that is the sensor detection value at the reference change point. According to this aspect, the absolute value of the difference between the target detection value and the reference detection value can be quantitatively calculated as the index value.

(3) In the above aspect, the detection of the plurality of change points may include detecting that a data point indicating one of the sensor detection values is the change point at which the sensor detection value changes by the predetermined value or more when a change index value calculated using a target sensor detection value that is the one of the sensor detection values and two of the sensor detection values located on both sides of the target sensor detection value, among the plurality of sensor detection values, satisfies a predetermined criterion. According to this aspect, the change point can be easily detected using the target sensor detection value and the two sensor detection values located on both sides thereof.

(4) In the above aspect, the calculation of the index value may include determining a specific change point as the target change point when two of the sensor detection values indicated by two of the change points located before and after the specific change point along the specific variable axis, among the plurality of change points, are at least one of greater than or smaller than the sensor detection value of the specific change point. According to this aspect, the target change point can be easily determined using the three sensor detection values.

(5) In the above aspect, the calculation of the index value may include performing, at each of the change points located within an analysis range centered on the target change point with respect to the specific variable axis, (i) extraction of one of the change points as an extraction reference point in a two-axis graph represented by the specific variable axis and a detection axis that represents the sensor detection value and is different from the specific variable axis, (ii) calculation of a target area that is an area of a target region surrounded by an auxiliary line and a plurality of plots, the auxiliary line, in the graph, extending from the extraction reference point along the specific variable axis and extending toward a side opposite to the extraction reference point across the target change point with respect to the specific variable axis, the plurality of plots corresponding to the plurality of sensor detection values on the graph, and (iii) calculation of a length of a line segment forming the target region of the auxiliary line, and determining, as the reference change point, the extraction reference point having the largest ratio of the target area with respect to the length of the line segment based on calculation of the target area and the length of the line segment for each of the extraction reference points. According to this aspect, the reference change point can be determined using the target area and the length of the line segment.

(6) In the above aspect, the calculation of the target area may include setting, in the target region, an area of a first region located on the same side as the target change point with respect to the auxiliary line as a positive value and an area of a second region located on the opposite side to the target change point with respect to the auxiliary line as a negative value. According to this aspect, the target area can be easily calculated by using the target region and the auxiliary line.

(7) The above aspect may further include comparing the index value with a predetermined reference threshold value, and determining that abnormality occurs at the target change point when the index value exceeds the reference threshold value. According to this aspect, the presence or absence of abnormality at the target change point can be easily determined using the index value.

(8) According to a second aspect of the present disclosure, a device is provided. This device includes an acquisition unit configured to acquire data indicating a plurality of sensor detection values arranged in order along a specific variable axis, a detection unit configured to detect a plurality of change points that are data points at which the sensor detection value on the specific variable axis changes by a predetermined value or more in the data, and a calculation unit configured to calculate, for a target change point that is one change point among the plurality of change points, an index value representing a degree of abnormality of the target change point using the target change point and a reference change point that is another change point. According to this aspect, the index value representing the degree of abnormality can be calculated using the target change point and the reference change point that is the other change point for the target change point, and thus the degree of abnormality can be calculated quantitatively.

(9) According to a third aspect of the present disclosure, a computer program is provided. This computer program causes a computer to perform an acquisition function configured to acquire data indicating a plurality of sensor detection values arranged in order along a specific variable axis, a detection function configured to detect a plurality of change points that are data points at which the sensor detection value on the specific variable axis changes by a predetermined value or more in the data, and a calculation function configured to calculate, for a target change point that is one change point among the plurality of change points, an index value representing a degree of abnormality of the target change point using the target change point and a reference change point that is another change point. According to this aspect, the index value representing the degree of abnormality can be calculated using the target change point and the reference change point that is the other change point for the target change point, and thus the degree of abnormality can be calculated quantitatively.

The present disclosure can be realized in the form of a non-transitory tangible storage medium, etc. capable of reading a computer program in which a computer program is recorded.

What is claimed is:

1. A method, comprising:
    acquiring data indicating a plurality of sensor detection values arranged in order along a specific variable axis;
    storing the data indicating the plurality of sensor detection values in a memory;
    detecting, in the stored data, a plurality of change points that are data points at which respective sensor detection values of the plurality of sensor detection values on the specific variable axis changes by at least a predetermined value;
    calculating, for a target change point that is one change point among the plurality of change points, an index value representing a degree of abnormality using the target change point and a reference change point that is another change point among the plurality of change points, wherein
    the calculation of the index value includes calculating an absolute value of a difference between a target detection value that is a sensor detection value of the plurality of sensor detection values at the target change point and a reference detection value that is the sensor detection value at the reference change point; and
    controlling display of the index value and a time point on the specific variable axis at which the abnormality has occurred.

2. The method according to claim 1, wherein the detection of the plurality of change points includes detecting that a data point indicating one of the plurality of sensor detection values is a change point at which the sensor detection value changes by at least the predetermined value in a case where a change index value calculated using a target sensor detection value that is the one of the plurality of sensor detection values and two of the plurality of sensor detection values located on both sides of the target sensor detection value, among the plurality of sensor detection values, satisfies a predetermined criterion.

3. The method according to claim 1, wherein the calculation of the index value includes determining a specific change point as the target change point at least in a case where two of the plurality of sensor detection values indicated by two of the plurality of change points located before and after the specific change point along the specific variable axis, among the plurality of change points, are either greater than or smaller than the sensor detection value of the specific change point.

4. The method according to claim 3, wherein the calculation of the index value includes:
    performing, for each of the plurality of change points located within an analysis range centered on the target change point with respect to the specific variable axis,
        (i) extraction of one of the plurality of change points as an extraction reference point in a two-axis graph represented by the specific variable axis and a detection axis that represents the sensor detection value and is different from the specific variable axis,
        (ii) calculation of a target area that is an area of a target region surrounded by an auxiliary line and a plurality of plots, the auxiliary line, in the two-axis graph, extending from the extraction reference point along the specific variable axis and extending toward a side opposite to the extraction reference point across the target change point with respect to the specific variable axis, the plurality of plots corresponding to the plurality of sensor detection values on the two-axis graph, and
        (iii) calculation of a length of a line segment forming the target region of the auxiliary line; and
    determining, as the reference change point, the extraction reference point having a largest ratio of the target area with respect to the length of the line segment based on the calculation of the target area and the length of the line segment for each of a plurality of extraction reference points.

5. The method according to claim 4, wherein the calculation of the target area includes setting, in the target region, an area of a first region located on a same side as the target change point with respect to the auxiliary line as a positive value and an area of a second region located on an opposite side to the target change point with respect to the auxiliary line as a negative value.

6. The method according to claim 1, further comprising:
comparing the index value with a predetermined reference threshold value; and
determining that the abnormality occurs at the target change point in a case where the index value exceeds the predetermined reference threshold value.

7. A device, comprising:
an acquisition unit configured to acquire data indicating a plurality of sensor detection values arranged in order along a specific variable axis;
a memory configured to store the data indicating the plurality of sensor detection values;
a detection unit configured to detect a plurality of change points that are data points at which respective sensor detection values of the plurality of sensor detection values on the specific variable axis changes by at least a predetermined value in the stored data;
a calculation unit configured to calculate, for a target change point that is one change point among the plurality of change points, an index value representing a degree of abnormality of the target change point using the target change point and a reference change point that is another change point among the plurality of change points, wherein
the calculation of the index value includes calculation of an absolute value of a difference between a target detection value that is a sensor detection value of the plurality of sensor detection values at the target change point and a reference detection value that is the sensor detection value at the reference change point; and
an output unit configured to control display of the index value and a time point on the specific variable axis at which the abnormality has occurred.

8. A non-transitory computer-readable storage medium having stored thereon computer-executable instructions, that when executed by a processor, cause the processor to execute operations, the operations comprising:
acquiring data indicating a plurality of sensor detection values arranged in order along a specific variable axis;
storing the data indicating the plurality of sensor detection values in a memory;
detecting a plurality of change points that are data points at which respective sensor detection values of the plurality of sensor detection values on the specific variable axis changes by at least a predetermined value in the stored data;
calculating, for a target change point that is one change point among the plurality of change points, an index value representing a degree of abnormality of the target change point using the target change point and a reference change point that is another change point among the plurality of change points, wherein
the calculation of the index value includes calculating an absolute value of a difference between a target detection value that is a sensor detection value of the plurality of sensor detection values at the target change point and a reference detection value that is the sensor detection value at the reference change point; and
controlling display of the index value and a time point on the specific variable axis at which the abnormality has occurred.

* * * * *